United States Patent Office 2,919,929
Patented Jan. 5, 1960

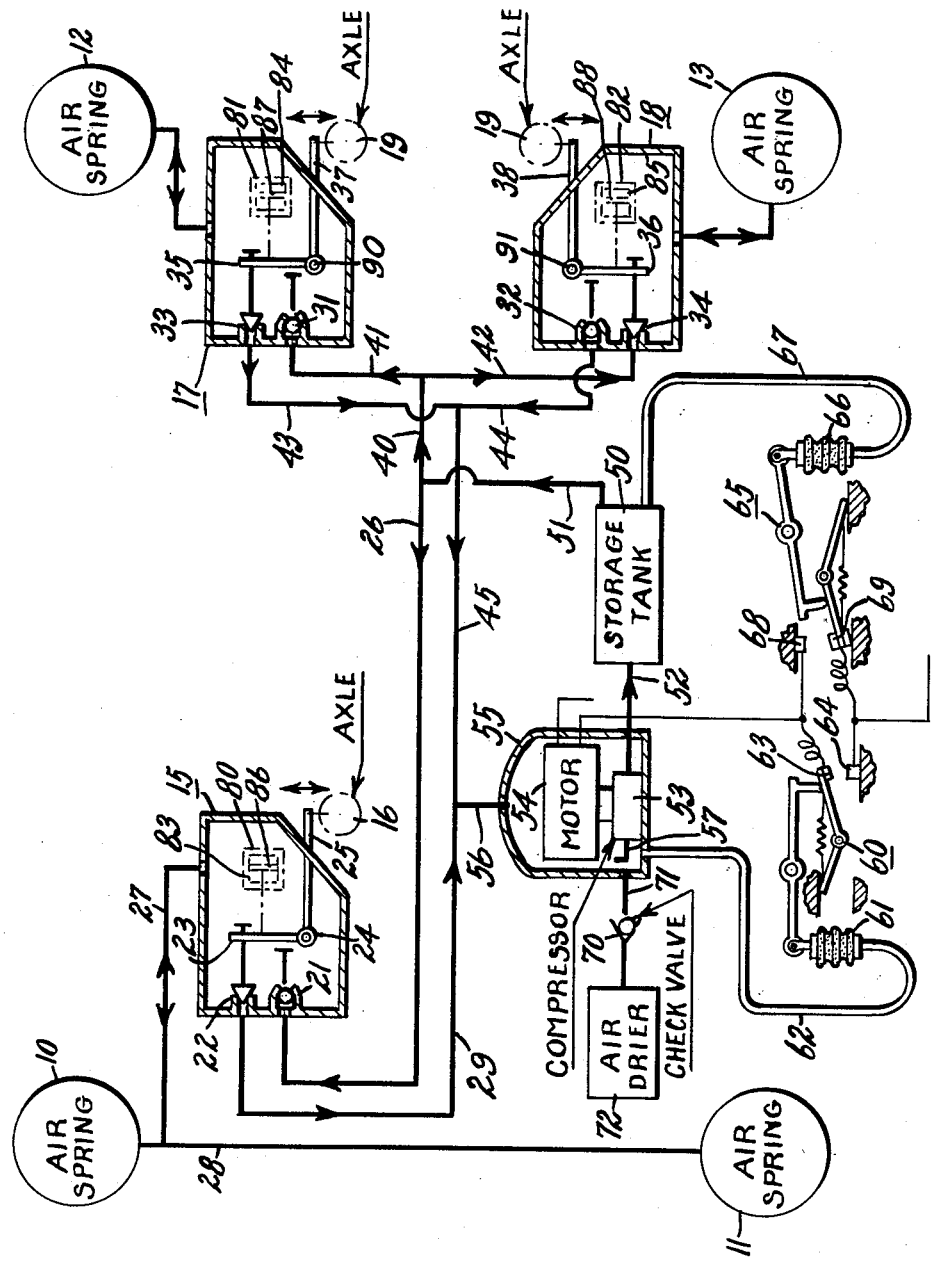

2,919,929

CLOSED AIR SUSPENSION AND AIR SUPPLY SYSTEM

George W. Jackson, Dayton, Ohio, assignor to General Motors Corporation, Detroit, Mich., a corporation of Delaware Application July 18, 1958, Serial No. 749,430

10 Claims. (Cl. 280—124)

This invention relates to an air suspension system for motor vehicles, that is a system in which a fluid spring or air spring is placed between the sprung mass and the unsprung mass of the vehicle, or between the body and the running gear.

In air suspension systems for motor vehicles it has become the common practice to place an expansible air chamber between the body, or sprung mass; and the running gear, or unsprung mass, of the vehicle. The closed chamber forming the air spring may be of an expansible bellows type, of a diaphragm type, or of a type in which a piston operates within a chamber with a flexible diaphragm disposed between the piston and the wall of the chamber. In all of the air springs, however, air pressure is maintained to provide resilient support for the sprung mass upon the unsprung mass of the vehicle.

In the air suspension system there is also conventionally provided control valve means that responds to a change in clearance height between the sprung mass and the unsprung mass of the vehicle so that upon an increase of load in the vehicle the control valve means will supply air pressure to the air springs and thereby restore the predetermined clearance height between the sprung mass and the unsprung mass under the new load condition. Similarly, when the load in the vehicle decreases, and the sprung mass tends to rise relative to the unsprung mass, the control valve means will respond to this increase in clearance height and thereby exhaust air from the air springs to restore the sprung mass to the predetermined clearance height relative to the unsprung mass.

It is, of course, apparent that the supply and exhaust of air to and from the air springs will require a continuous makeup of air that can be supplied to the air springs after being compressed to a suitable pressure value and stored within a high-pressure chamber for the purpose of supply of air to the air springs. The requirement for continuously making up for air that is used in supplying the air springs has constituted a problem in air suspension systems because continual withdrawal of air from the atmosphere and placing it under compression by a compressor results in the admission in a considerable quantity of moisture into the air suspension system that must some way be eliminated. The moisture trouble is particularly noticeable in cold weather when the moisture in the system tends to freeze at critical spots unless suitable moisture traps are provided in the air suspension system in an effort to trap the moisture before it gets to critical areas such as the control valves and the air springs. The equipment necessary to provide the precautions required to eliminate difficulties from entry of moisture into the air suspension system is quite expensive and the equipment also requires periodical draining which, if not followed religiously by the operator of the vehicle, can still result in trouble within the air suspension system.

It is, therefore, an object of this invention to provide a completely closed air suspension system wherein the air once in the system is continuously recirculated thereby eliminating moisture difficulties. If the air suspension system has no leaks, the closed system of this invention would never require admission of any fresh air from the atmosphere. The only time the system of this invention receives any air from atmosphere is in the event a leak is developed. Such a closed air suspension system reduces moisture and dirt problems to a minimum.

It is another object of the invention to provide a closed air suspension system for continuous recirculation of air within the system wherein air is supplied to the air springs from a high-pressure storage tank under regulation of height control valves that respond to changes in clearance height between the sprung mass and the unsprung mass of the vehicle. Air exhausted from the air springs as a result of operation of the height control valves is returned in a closed circuit directly to the air compressor for immediate redelivery to the high-pressure storage tank. The air compressor of the system is under primary control of a pressure-actuated control switch that responds to an increase of air pressure at the compressor resulting from return of exhaust air from the air springs, the compressor being activated as a result of the pressure rise for delivery of the air to the high-pressure storage tank, and the compressor being stopped when the pressure at the compressor reaches a predetermined minimum low value that is somewhat above atmosphere. The arrangement is such that no fresh air from the atmosphere will be required for admission into the system so long as the air suspension system is tight and no loss of air occurs.

Should the air suspension system of the foregoing object develop leaks, resulting in loss of air from the closed air system, a second control means responding to the pressure in the high-pressure storage tank will close to activate the air compressor in the event the pressure in the storage tank falls below a predetermined minimum value. So long as the transfer of air from the low-pressure side of the air suspension system to the high-pressure side maintains the pressure in the storage tank above the predetermined minimum value at which the second control switch is set to be actuated, this second control switch will have no effect on operation of the compressor. But once the air pressure in the high-pressure storage tank falls below the predetermined minimum value, then the control switch that responds to the pressure in this high-pressure storage tank will be operated to render the air compressor active regardless of the first control switch, and will over-ride the first control switch, to maintain the compressor active until the air pressure in the high-pressure storage tank reaches a predetermined maximum value.

Under the condition of operation just mentioned, fresh air is admitted to the compressor from atmosphere by way of a check valve only when the air pressure on the low-pressure side of the system falls below a predetermined minimum value, such as atmospheric pressure. If the pressure in the high-pressure storage tank can be restored from air in the low-pressure side of the system with the compressor being under control of the second control means, no air will be drawn into the low-pressure side of the system from atmosphere. But, if the air pressure on the low-pressure side is insufficient to restore the pressure in the high-pressure storage tank to a predetermined maximum value, then the check valve means will open when the pressure on the low-pressure side of the system reaches a predetermined minimum value to allow just sufficient air to enter the low-pressure side of the system that will restore the air pressure in the high-pressure storage tank to the predetermined maximum pressure value.

Further objects and advantages of the present invention will be apparent from the following description, reference being had to the accompanying drawings wherein preferred embodiments of the present invention are clearly shown.

The drawing illustrates schematically an air suspension system incorporating the features of this invention wherein the air suspension system for a motor vehicle includes the air springs 10 and 11 located at the forward end of the vehicle and the air springs 12 and 13 located at the rear of the vehicle. The air springs are positioned conventionally between the body and running gear of the vehicle to resiliently support the body upon the running gear.

The air pressure within the forward air springs 10 and 11 is under regulation of a height control valve 15 that responds to a change in clearance height between the sprung mass and the unsprung mass of the vehicle to supply air to the air springs 10 and 11 on an increase of load in the vehicle and exhaust air from these air springs on a decrease of load whereby to maintain the clearance height between the sprung mass and the unsprung mass relatively constant. The height control valve 15 is preferably secured to the sprung mass or body of the vehicle. The axle to which the body is referenced is represented by the member 16.

At the forward end of the vehicle there is provided the single height control valve 15 which regulates the air pressure in both forward air springs 10 and 11. At the rear of the vehicle, there is provided a height control valve 17 that regulates the pressure of the air in the air spring 12 and a similar height control valve 18 that regulates the pressure of the air in the air spring 13. The control valves 17 and 18 are preferably secured to the body of the vehicle and the rear axle to which they are referenced is represented by the members 19.

The height control valve 15 includes an inlet valve 21 and an exhaust valve 22 which are actuated by an arm 23 pivoted at 24 and actuated by the arm 25 that connects with the axle 16. Thus, when the body of the vehicle moves downwardly, carrying valve 15 with it toward the axle 16, the arm 23 will be rotated in a counterclockwise direction to open the inlet valve 21 allowing air under pressure to be admitted from the high-pressure supply line 26 into the valve 15 and flow into the line 27 that connects with the line 28 for supply of air under pressure to the air springs 10 and 11 until the predetermined height relation is restored between the sprung mass and the unsprung mass of the vehicle.

When the load in the vehicle decreases, the valve 15, carried by the body, rises relative to the axle 16, the arm 23 will rotate in a counterclockwise direction and thereby open the exhaust valve 22 to allow air under pressure to exhaust from the air springs 10 and 11 into the exhaust line 29.

Similarly, the height control valves 17 and 18 regulating air pressure in the air springs 12 and 13 respectively are each provided with inlet valves 31 and 32 and exhaust valves 33 and 34 respectively operated by their respective arms 35 and 36 in the same manner as the corresponding valves of height control valve 15 when the valves 17 and 18 move relative to the axle members 19, the arms 37 and 38 being adapted for connection with the axle members.

Air under pressure is supplied to the valves 17 and 18 through the lines 40, 41 and 42. Exhaust of air from the air springs is through the lines 43, 44 and 45.

Air under pressure is supplied to the supply lines 26 and 40 from a high-pressure air storage tank 50 by way of the line 51. The high-pressure air storage tank 50 receives air under pressure through the line 52 from the air compressor 53 that is driven by the electric motor 54.

The motor and compressor unit 54, 53 is preferably contained within an enclosing housing or shell 55 that hermetically seals the motor and compressor unit within the shell.

The exhaust lines 29 and 45 from the respective height control valves connect with the motor compressor shell 55 by the line 56 so that air exhausted from the air springs under control of the respective height control valves is returned to the compressor housing 55. The compressor 53 has the inlet side thereof connected with the interior of the housing 55 by the inlet line 57 so that all air received by the compressor 53 for compression into the line 52 delivered into the storage tank 50 is obtained from within the compressor housing 55, which air is all exhausted from the air springs 10, 11, 12 and 13 that has previously been supplied to these springs from the high-pressure storage tank under control of the respective height control valves 15, 17 and 18.

From the foregoing description it will be apparent that the air circulating system of the air suspension system is a completely closed circuit so that once air pressure of a predetermined maximum value has been established in the high-pressure storage tank 50, the same air will be continuously circulated within the system and will merely be transferred from the exhaust side, or low-pressure side of the system, to the high-pressure side of the system by way of the air compressor restoring the air to the high-pressure value for storage in the high-pressure tank 50.

To control actuation of the compressor 53 to effect transfer of air from the low-pressure side of the system to the high-pressure side of the system with the air being placed under compression in the transfer, a pressure control switch 60 is provided. This switch 60 has a pressure sensitive element 61 that connects with a line 62 with the interior of the motor compressor housing 55.

In normal operation, the control switch 60 cycles the compressor 53 from a predetermined high-pressure value in the housing 55 to a predetermined low-pressure value. That is, when the air exhausted from the air springs 10, 11, 12 and 13 under control of the respective valves 15, 17 and 18 reaches a predetermined high value within the compressor housing 55, the switch 60 will close contacts 64 and 63 thereby energizing the motor 54 for operation of the compressor 53. The compressor will draw its inlet air from within the compressor housing 55 and deliver air under pressure into the storage tank 50. When the air pressure within the compressor housing 55 reaches a predetermined minimum low value, the switch 60 will de-energize the motor and stop the compressor. It will thus be seen that the cyclic operation of the compressor is such as to intermittently transfer air from the low-pressure side of the system to the high-pressure side of the system and maintain the high-pressure side at predetermined pressure value.

It will be appreciated that, from a practical standpoint, air suspension systems are not absolutely leakproof and, therefore, some air will gradually disappear with the result that the total volume of air within the air suspension system falls off so that the transfer of air from the motor compressor housing 55 to the high-pressure storage tank by the compressor 53 will gradually result in insufficient air being transferred to maintain the air pressure within the high-pressure storage tank 50 at the predetermined maximum pressure value, or within a predetermined pressure range. If nothing were done, and the system gradually leaked air, ultimately the air loss would be sufficient to result in ineffective operation of the air suspension system. To prevent this, a second control switch 65 is provided to by-pass or over-ride the effect of the control switch 60. The control switch 65 has a pressure responsive element 66 that responds to the pressure in the high-pressure storage tank through the line 67. So long as the air pressure within the high-pressure storage tank 50 remains above a predetermined minimum value, the control switch 65 will be in its inoperative position holding contacts 68 and 69 open. Thus, normally, so long as there is sufficient air in the air suspension system, that air can be transferred from the low-pressure side of the system to the high-pressure side by the compressor 53 and maintain air pressure in the storage tank 50 above a predetermined minimum value, control switch 65 is ineffective.

However, whenever loss of air from the air suspension system is sufficient to result in air pressure in the high-pressure storage tank 50 falling below a certain predetermined minimum value, then control switch 65 will be actuated by this low pressure to close contacts 68 and 69 for actuation of the compressor 53. This can occur either concurrently with operation of control switch 60, or independent thereof, and will occur only if air pressure within the storage tank 50 is not maintained above the predetermined minimum value by the cyclic operation of the compressor under control of the switch 60.

Whenever control switch 65 operates, this is an indication of loss of air from the air suspension system and "make up" air must be obtained to restore the air pressure in the high-pressure tank 50 to a predetermined maximum high value, at which the control switch 65 will open contacts 68 and 69 to de-energize the motor 54.

This make up air is obtained through the check valve 70 connected by the line 71 with the interior of the compressor housing 55 and which receives air from atmosphere through the air dryer 72.

Under normal operation of the compressor 53, under the cyclic control of the switch 60, check valve 70 will not open because it is adjusted to open only if pressure in the compressor housing 55 falls below a predetermined minimum value at which the compressor 53 is normally stopped by the control switch 60. Thus, normally, during cyclic operation of the compressor 53 to transfer air from the low-pressure side of the system within the housing 55 to the high-pressure side of the system in the storage tank 50, the minimum air pressure value within the housing 55 will constantly be above the low-pressure value at which check valve 70 would open. Therefore, check valve 70 is normally inactive during normal operation of the air suspension system.

However, at a time when control switch 65 is rendered effective as a result of below-normal air pressure in the storage tank 50, it is obvious that the air in the low-pressure side of the system will be insufficient to provide for restoration of air pressure in the tank 50 to a predetermined maximum high value. Thus, the compressor 53 will remain under control of the switch 65 so that gradually the air pressure in the compressor chamber 55 will fall below the normal minimum value maintained under cyclic operation of the compressor by control switch 60, so that ultimately check valve 70 will open to allow air from the atmosphere to enter the motor compressor housing 55 and thereby be supplied to the compressor 53 for compression into the storage tank 50 for restoration of air pressure in this tank to a predetermined maximum value, at which control switch 65 will open and thereby stop the compressor 53.

After the previously described pressure restoring operation in the high-pressure tank 50, the air suspension system will return to normal operation with normal cyclic transfer of air from the low-pressure side to the high-pressure side of the system with check valve 70 remaining closed.

In the foregoing description, the height control valves 15, 17 and 18 have been described as non-delay valves, that is valves in which the movement of the actuating arms 23, 35 and 36 of the respective valves follow each and every individual movement of the axle elements 16 and 19, with the result that air is being continually admitted to the air springs and exhausted from the air springs on every up and down movement of the car body relative to the axle. To avoid this condition, the arms 23, 35 and 36 of the respective valves 15, 17 and 18 may be provided with damping devices 80, 81 and 82 that retard movement of the respective arms and thereby prevent the actuating arms moving as rapidly as the axle elements. If the up and down movements are of equivalent value, there is no effective movement of the actuating arms 23, 35 and 36 if a slight delay time is applied to the arms by the respective damping devices.

The damping devices 80, 81 and 82 may consist merely of fluid filled containers 83, 84 and 85 having therein reciprocable pistons 86, 87 and 88 respectively, clearance between the pistons and the walls of their respective cylinders providing for damping flow of fluid between the opposite ends of the damping cylinders. To allow greater movement of the actuating arms 25, 37 and 38 that are connected with the axle elements 16 and 19 than is effected on the arms 23, 35 and 36, held under control of their respective damping devices, the pivot connections 24, 90 and 91 are resilient to allow for this relative movement between the arms.

While the embodiments of the present invention as herein disclosed constitute a preferred form, it is to be understood that other forms might be adopted.

What is claimed is as follows:

1. An air suspension system for a motor vehicle, comprising, air spring means in closed circuit air flow communication with height control valve means regulating air pressure in the air spring means in response to change in height relation between the sprung mass and the unsprung mass of a vehicle, said height control valve means being in closed circuit air flow communication with a low-pressure air return chamber and a high-pressure air supply chamber, said chambers being in closed air flow communication through an air compressor receiving air from said low-pressure chamber and delivering air under pressure to said high-pressure chamber, control means responsive to increase in air pressure in said low-pressure chamber to activate said compressor to transfer air from the low-pressure chamber to the high-pressure chamber and deactivate the compressor on decrease in air pressure in the low-pressure chamber, and additional control means responsive to decrease of air pressure in said high-pressure chamber to maintain said compressor active until pressure in said high-pressure chamber reaches a predetermined value irrespective of operation of said first control means.

2. An air suspension system for a motor vehicle, comprising, air spring means in closed circuit air flow communication with height control valve means regulating air pressure in the air spring means in response to change in height relation between the sprung mass and the unsprung mass of a vehicle, said height control valve means being in closed circuit air flow communication with a low-pressure air return chamber and a high-pressure air supply chamber, said chambers being in closed air flow communication through an air compressor receiving air from said low-pressure chamber and delivering air under pressure to said high-pressure chamber, control means responsive to increase in air pressure in said low-pressure chamber to activate said compressor to transfer air from the low-pressure chamber to the high-pressure chamber and deactivate the compressor on decrease in air pressure in the low-pressure chamber, and additional control means responsive to pressure in said high-pressure chamber and normally inactive so long as pressure in the high-pressure chamber is above a predetermined value but rendered active upon decrease of pressure in the high-pressure chamber below the said predetermined value to render thereby said compressor active until the pressure in the high-pressure chamber is returned to the predetermined value irrespective of operation of said first control means.

3. An air suspension system for a motor vehicle, comprising, air spring means in closed circuit air flow communication with height control valve means regulating air pressure in the air spring means in response to change in height relation between the sprung mass and the unsprung mass of a vehicle, said height control valve means being in closed circuit air flow communication with a low-pressure air return chamber and a high-pressure air supply chamber, said chambers being in closed air flow communication through an air compressor receiving air from said low-pressure chamber and delivering air under pressure to said high-pressure chamber, said low-pressure chamber having air inlet control valve means providing for inlet of air from the atmosphere to the low-pressure chamber when air pressure in the low-pressure chamber falls below the said predetermined value, control means responsive to increase in air pressure in said low-pressure chamber to activate said compressor to transfer air from the low-pressure chamber to the high-pressure chamber and to deactivate the compressor on decrease of air pressure in the low-pressure chamber to a value above the value at which said air pressure inlet control valve provides for admission of air into said low-pressure chamber, and additional control means responsive to pressure in said high-pressure chamber normally inactive but rendered active upon decrease of pressure in said high-pressure chamber below a predetermined minimum value to maintain said compressor active until pressure in said high-pressure chamber reaches a value above the said predetermined minimum value even though said first control means has been rendered inactive for operation of the compressor by pressure value in the low-pressure chamber falling below a predetermined minimum value at which said first control means normally renders said compressor inactive.

4. An air suspension system arranged in accordance with the system of claim 3 wherein the first control means normally renders the compressor active at a predetermined maximum pressure value above atmosphere and renders the compressor inactive at a second predetermined minimum pressure value above atmosphere, the compressor thereby maintaining the said low-pressure chamber within predetermined pressure limits as governed by the first control means, and wherein the second control means renders said compressor active at a predetermined minimum pressure below a normal minimum pressure maintained in said high-pressure chamber at which said second control means is maintained inactive so long as the pressure in the high-pressure chamber is increased above the normal minimum pressure value during operation of the compressor under effect of the first control means.

5. An air suspension system arranged in accordance with the system of claim 3 wherein the first control means normally renders the compressor inactive at a pressure value above atmosphere and renders the compressor active at a second higher predetermined value above atmosphere, the compressor thereby maintaining the said low-pressure chamber within predetermined pressure limits as governed by the first control means, and wherein said second control means renders said compressor active at a predetermined minimum pressure below maximum pressure normally maintained in said high-pressure chamber, which second control means is rendered inactive in the event the pressure in the high-pressure chamber is increased above the minimum pressure value at which the second control means becomes active during operation of the compressor under effect of the first control means, but wherein said second control means maintains said compressor active in the event said first control means attempts to render said compressor inactive before pressure in said high-pressure chamber has been increased to the minimum pressure value at which said second control means becomes active.

6. An air suspension system arranged in accordance with the system of claim 3 wherein the first control means normally renders the compressor inactive at a pressure value above atmosphere and renders the compressor active at a second higher predetermined value above atmosphere, the compressor thereby maintaining the said low-pressure chamber wherein predetermined pressure limits as governed by the first control means, and wherein said second control means renders said compressor active at a predetermined minimum pressure below maximum pressure normally maintained in said high-pressure chamber, which second control means is rendered inactive in the event the pressure in the high-pressure chamber is increased above the minimum pressure value at which the second control means becomes active during operation of the compressor under effect of the first control means, but wherein said second control means maintains said compressor active in the event said first control means attempts to render said compressor inactive before pressure in said high-pressure chamber has been increased to the minimum pressure value at which said second control means becomes active, said second control means retaining said compressor active for supply of air under pressure to said high-pressure chamber irrespective of the pressure value in said low-pressure chamber, said compressor obtaining additional air for supply to the high-pressure chamber under this condition by way of an inlet control valve means which opens when pressure in the low-pressure chamber reaches a predetermined minimum value below that at which said first control means normally renders said compressor inactive.

7. An air suspension system for a motor vehicle, comprising, air spring means in closed circuit air flow communication with height control valve means regulating air pressure in the air spring means in response to change in height relation between the sprung mass and the unsprung mass of a vehicle, a motor and an air compressor unit contained within a housing forming an enclosure for the same and forming a low-pressure air chamber from which said compressor receives air for compression in said compressor, said height control valve means being in closed circuit air flow communication with said low-pressure chamber for receiving exhaust air from said air springs under control of said height control valve means and with a separate high-pressure air supply chamber from which air under pressure is supplied to said height control valve means, said chambers being in closed air flow communication through said air compressor receiving air from said low-pressure chamber that is returned from said air springs and delivering air under pressure to said high-pressure chamber for storage for supply to said air springs, control means responsive to variation in air pressure in said low-pressure chamber to cyclically activate said compressor for transfer of air from the low-pressure chamber to the high-pressure chamber, and additional control means rendered active on decrease of air pressure in said high-pressure chamber below a predetermined value to over-ride the effect of said first control means until pressure in said high-pressure chamber is established to a predetermined maximum value in the event said first control means would render said compressor inactive before the predetermined maximum pressure value of the high-pressure chamber is reached with the compressor under control of said first control means.

8. An air suspension system arranged in accordance with the system of claim 7 wherein the first control means normally renders the compressor inactive at a pressure value above atmosphere and renders the compressor active at a second predetermined value above atmosphere, the compressor thereby maintaining the said low-pressure chamber within predetermined pressure limits as governed by the first control means, and wherein said second control means renders said compressor active at a predetermined minimum pressure below maximum pressure normally maintained in said high-pressure chamber, which second control means is rendered inactive in the event the pressure in the high-pressure chamber is increased above the minimum pressure value at which the second control means becomes active during operation of the compressor under effect of the first control means.

9. An air suspension system arranged in accordance with the system of claim 7 wherein the first control means normally renders the compressor inactive at a pressure value above atmosphere and renders the compressor active at a second predetermined value above atmosphere, the compressor thereby maintaining the said low-pressure chamber within predetermined pressure limits as governed by the first control means, and wherein said second control means renders said compressor active at a predetermined minimum pressure below maximum pressure normally maintained in said high-pressure chamber, which second control means is rendered inactive in the event the pressure in the high-pressure chamber is increased above the minimum pressure value at which the second control means becomes active during operation of the compressor under effect of the first control means, but wherein said second control means maintains said compressor active in the event said first control means attempts to render said compressor inactive before pressure in said high-pressure chamber has been increased to the minimum pressure value at which said second control means becomes active.

10. An air suspension system arranged in accordance with the system of claim 7 wherein the first control means normally renders the compressor inactive at a pressure value above atmosphere and renders the compressor active at a second predetermined value above atmosphere, the compressor thereby maintaining the said low-pressure chamber within predetermined pressure limits as governed by the first control means, and wherein said second control means renders said compressor active at a predetermined minimum pressure below maximum pressure normally maintained in said high-pressure chamber, which second control means is rendered inactive in the event the pressure in the high-pressure chamber is increased above the minimum pressure value at which the second control means becomes active during operation of the compressor under effect of the first control means, but wherein said second control means maintains said compressor active in the event said first control means attempts to render said compressor inactive before pressure in said high-pressure chamber has been increased to the minimum pressure value at which said second control means becomes active, said second control means retaining said compressor active for supply of air under pressure to said high-pressure chamber irrespective of the pressure value in said low-pressure chamber, said compressor obtaining additional air for supply to the high-pressure chamber under this condition by way of an inlet control valve means which opens when pressure in the low-pressure chamber reaches a predetermined minimum value below that which renders said first control means inactive.

References Cited in the file of this patent

UNITED STATES PATENTS

| | | |
|---|---|---|
| 2,828,139 | Lautzenhiser | Mar. 25, 1958 |
| 2,844,385 | Pribonic | July 22, 1958 |